US012726121B2

(12) United States Patent
Chen et al.

(10) Patent No.: US 12,726,121 B2
(45) Date of Patent: Sep. 1, 2026

(54) MULTI-LEVEL CONVERTER

(71) Applicant: Nanjing Silergy Micro Technology Co., Ltd., Nanjing (CN)

(72) Inventors: Siyuan Chen, Nanjing (CN); Sihua Wen, Nanjing (CN); Yu Wu, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 223 days.

(21) Appl. No.: 18/617,966

(22) Filed: Mar. 27, 2024

(65) Prior Publication Data

US 2024/0333156 A1 Oct. 3, 2024

(30) Foreign Application Priority Data

Mar. 29, 2023 (CN) ......................... 202310322918.7

(51) Int. Cl.
*H02M 3/06* (2006.01)
*H02M 3/158* (2006.01)

(52) U.S. Cl.
CPC ............. *H02M 3/158* (2013.01); *H02M 3/06* (2013.01)

(58) Field of Classification Search
CPC ................................ H02M 3/158; H02M 3/06
See application file for complete search history.

(56) References Cited

U.S. PATENT DOCUMENTS 6,005,780 A 12/1999 Hua
6,580,258 B2 6/2003 Wilcox et al.
9,325,254 B2 4/2016 Deng et al.
9,331,588 B2 5/2016 Chen
9,488,680 B2 11/2016 Xu
2014/0078789 A1 3/2014 Li et al.
2014/0239934 A1 8/2014 Zhang
2015/0160270 A1 6/2015 Shi et al.
2015/0280578 A1 10/2015 Huang et al.
2018/0006559 A1* 1/2018 Chen .................. H02M 7/4833
2023/0378872 A1* 11/2023 Choi ..................... H02M 3/158
2024/0333149 A1* 10/2024 Chen ..................... H02M 3/158
2025/0357844 A1* 11/2025 Jong ................... H02M 1/0095

* cited by examiner

*Primary Examiner* — Adolf D Berhane

(57) ABSTRACT

A multi-level converter can include: a switch capacitor circuit having M flying capacitors and 2*(M+1) transistors, where M is a positive integer; an inductive element; a balance circuit coupled to a common node of the switch capacitor circuit and the inductive element, and including a balance switch and a balance capacitor; and where after a voltage of the balance capacitor is adjusted to a preset value, the flying capacitor and the flying capacitor are coupled to each other in one of series and parallel connections by controlling the balance switch to be selectively turned on and off.

14 Claims, 11 Drawing Sheets

MULTI-LEVEL CONVERTER

RELATED APPLICATIONS

This application claims the benefit of Chinese Patent Application No. 202310322918.7, filed on Mar. 29, 2023, which is incorporated herein by reference in its entirety.

FIELD OF THE INVENTION

The present invention generally relates to the field of power electronics, and more particularly to multi-level DC-DC converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Existing multi-level capacitor technology schemes are widely used because they can greatly reduce the volt-second product on the inductor, thereby reducing the volume of the inductor. However, the voltage balance of the capacitor in the multi-level capacitor technology scheme may have a great influence on the system performance. If the voltage balance of the capacitor is not good, the stress of a transistor (e.g., MOS) in the multi-level capacitor technology scheme can increase, possibly leading to damage and failure of the share. Therefore, a more complex active control strategy may be utilized to adjust the voltage balance of the capacitor.

Figure 1:
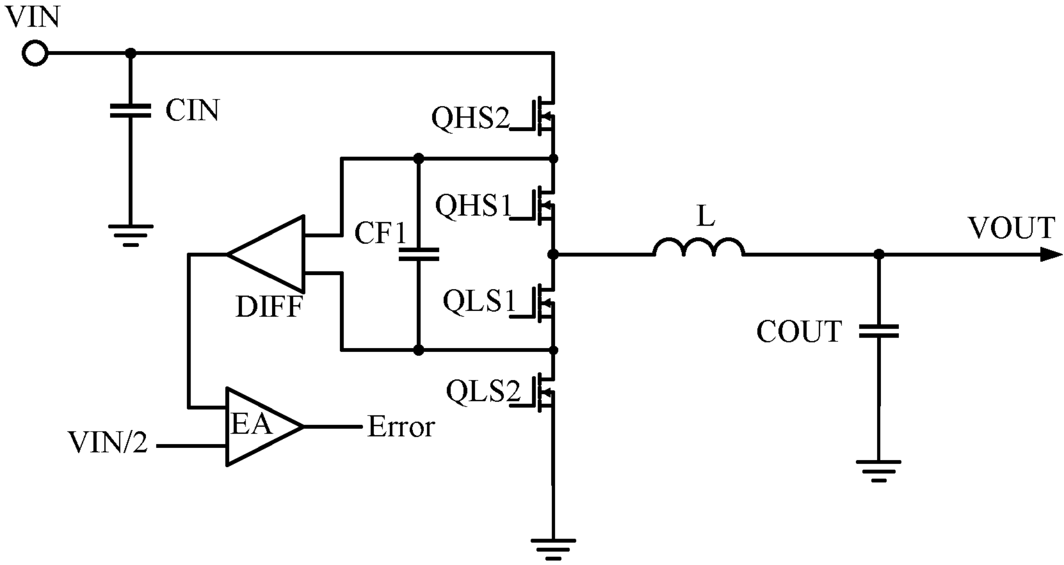
FIG. 1 is a schematic block diagram of an example three-level converter.

Referring now to FIG. 1, shown is a schematic block diagram of an example three-level buck converter. The voltage of flying capacitor CF1 can be detected by differential amplifier DIFF, and the output signal of differential amplifier DIFF can connect to an input terminal of error amplifier EA, which can be compared against half of the input voltage (VIN/2) to generate error signal 'Error'. Error signal 'Error' can control the phase relationship or duty cycle difference between transistors QHS1 and QHS2, in order to adjust the amount of charge charged into and discharged from flying capacitor CF1, and to control the voltage of flying capacitor CF1 to be equal to half of the input voltage (VIN/2). This approach may have advantages of high efficiency and low heating, but also problems of complex control, the voltage balance being affected by a load current relatively easily, and relatively poor balance effect under a dynamic duty cycle.

Figure 2:
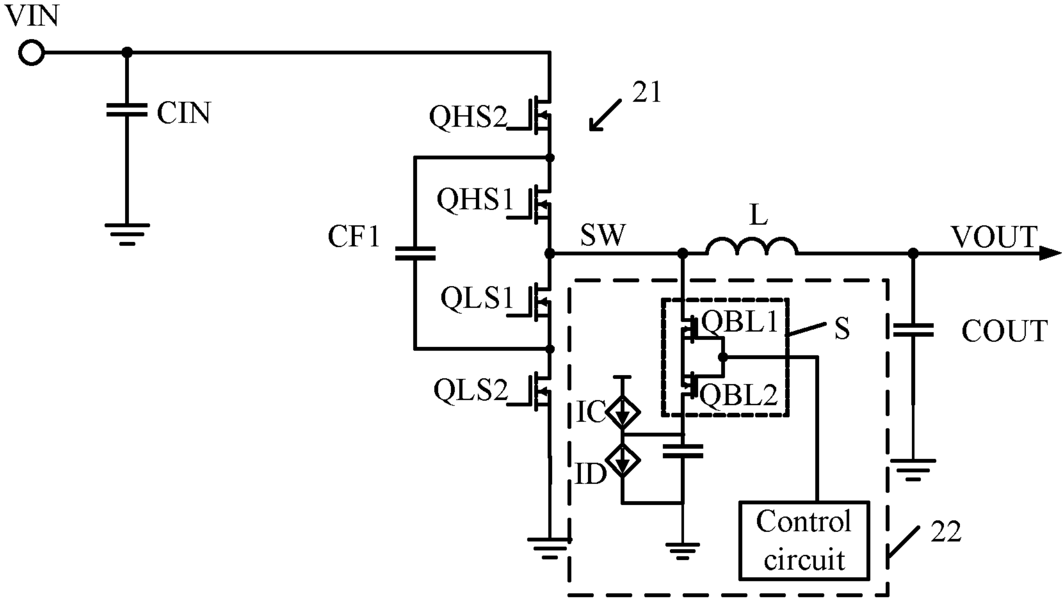
FIG. 2 is a schematic block diagram of a first example multi-level converter, in accordance with embodiments of the present invention.

Referring now to FIG. 2, shown is a schematic block diagram of a first example multi-level converter, in accordance with embodiments of the present invention. In this particular example, the multi-level capacitor converter (e.g., a three-level converter) can include switch capacitor circuit 21, balance circuit 22, and inductive element L. Switch capacitor circuit 21 can perform DC conversion for input voltage VIN, and may include filter capacitor CIN, flying capacitor CF1, and four transistors: QHS2, QHS1, QLS1, and QLS2. Filter capacitor CIN can connect to an input terminal of the multi-level converter to receive input voltage VIN. Transistors QHS2, QHS1, QLS1, and QLS2 can connect in series between input voltage VIN and a ground terminal of the three-level buck converter. One terminal of flying capacitor CF1 can connect to the common node of transistors QHS2 and QHS1, and the other terminal of flying capacitor CF1 can connect to the common node of transistors QLS1 and QLS2. Balance circuit 22 can include balance switch S and balance capacitor CBL. Balance switch S1 can be controlled to selectively turn on and off, such that flying capacitor CF1 and balance capacitor CBL may selectively be connected in series or in parallel. In this way, in different operating stages of an operating cycle, a proportional relationship between the voltage on balance capacitor CBL and the voltage on flying capacitor CF1, and a proportional relationship between the voltage on balance capacitor CBL, the voltage on flying capacitor CF1, and input voltage VIN or output voltage VOUT, can be generated, in order to achieve the balanced control of the flying capacitor.

Balance circuit 22 can connect to common node SW of switch capacitor circuit 21 and inductive element L, and can include balance switch S and balance capacitor CBL. When a voltage of the balance capacitor is adjusted to a preset value, the flying capacitor and the balance capacitor can be coupled to each other in one of series and parallel connections by controlling the balance switch to be selectively turned on and off. Balance circuit 22 can connect between common node SW and a ground terminal. Here, common node SW can be coupled with the output terminal or input terminal of the multi-level converter through the inductive element. In this example, the multi-level capacitor converter is a three-level buck converter, and common node SW is coupled to output voltage VOUT through inductive L. In addition, transistors QHS2 and QHS1 connected in series between input voltage VIN of the multi-level converter, and common node SW, may be configured as upper transistors, and transistors LS1 and QLS2 connected in series between common node SW and the ground terminal configured as lower transistors.

In particular embodiments, balance circuit 22 can include a balance sub-circuit including balance switch S1 and balance capacitor CBL connected in series. For example, balance switch S1 can be configured as a bidirectional current blocking transistor. The bidirectional current blocking transistor can include transistors QBL1 and QBL2 connected in series. When balance switch S1 is turned off, no current may be allowed to flow from common node SW to balance capacitor CBL, and no current allowed to flow from balance capacitor CBL to common node SW. Balance circuit 22 can also include a control circuit, which can control balance switch S to turn on and turn off. Further, in the three-level converter, when the voltage on common node SW is equal to input voltage VIN or zero voltage, balance switch S can be turned off. That is, when all the upper switches are turned on or no upper switch is turned on, balance switch S may be turned off. When balance switch S is turned off, balance circuit 22 can effectively be disconnected from common node SW. When balance switch S is turned on, balance capacitor CBL can connect to common node SW.

In one example, balance circuit 102 can also include a charging and discharging circuit for adjusting the voltage on balance capacitor CBL. For example, the charging and discharging circuit can include current source IC and current source ID connected in series. For example, one terminal of current source IC can connect to a supply voltage, and current source ID can connect in parallel with both terminals of balance capacitor CBL, where current source IC can charge balance capacitor CBL, and current source ID can discharge balance capacitor CBL.

Figure 3:
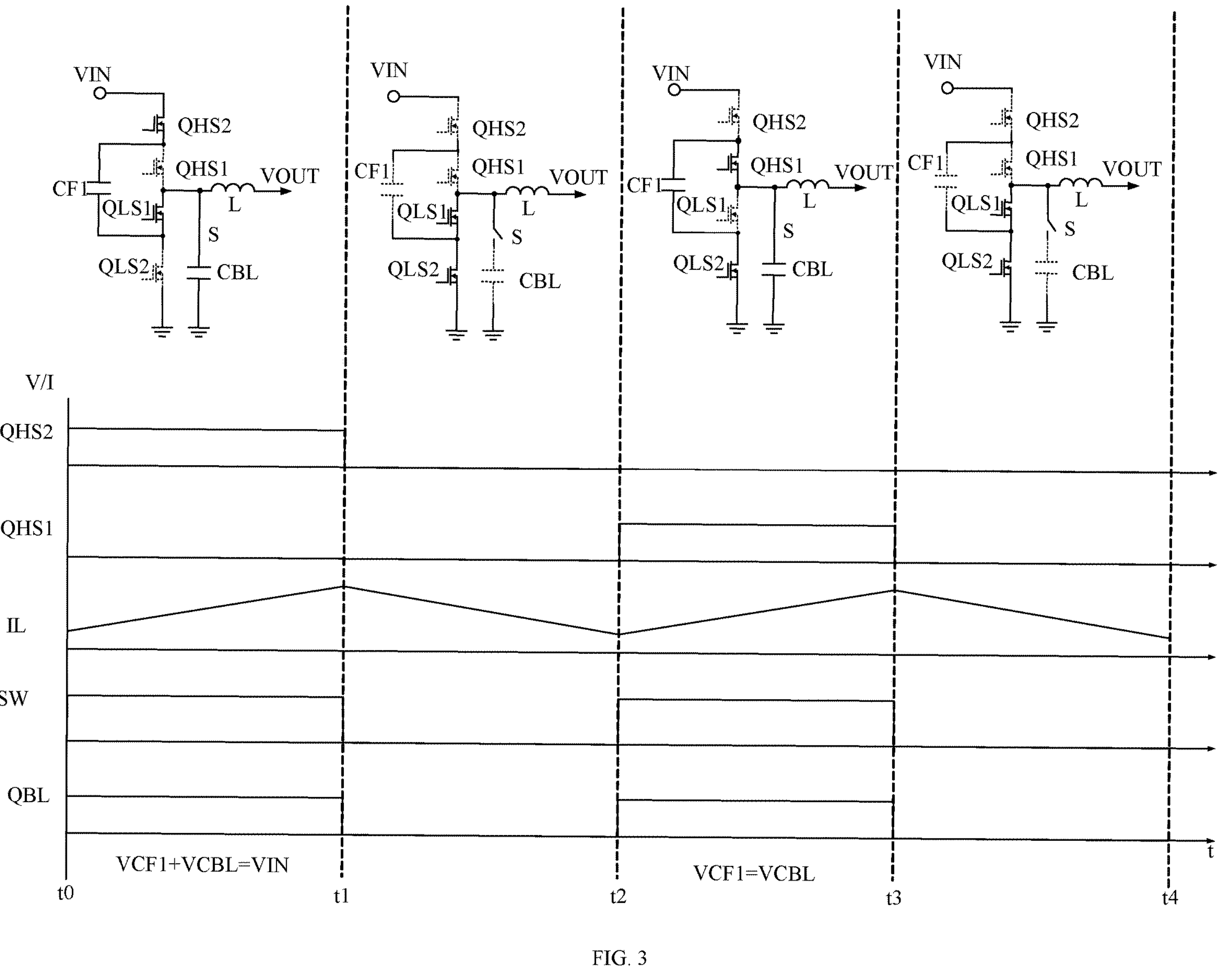
FIG. 3 is a waveform diagram of a first example operation of the three-level converter when a duty cycle is relatively small, in accordance with embodiments of the present invention.

Referring now to FIG. 3, shown is a waveform diagram of a first example operation of the three-level converter when a duty cycle is relatively small, in accordance with embodiments of the present invention. The following is combined with the waveform diagram (see, e.g., FIGS. 2-4) to explain the voltage balance principle and operation process of the three-level converter. Here, transistors QHS1 and QLS1 can be turned on in complementary fashion, and transistors QHS2 and QLS2 can be turned on in complementary fashion as an example to illustrate the operation principle and process. Each operation cycle of the three-level converter can include four stages, and it may be assumed that the capacity of flying capacitor CF1 is large enough so that the voltage of flying capacitor CF1 does not change significantly during the charging and discharging phase. When the duty cycle is less than 50%, that is, output voltage VOUT is less than half of input voltage VIN (VOUT<0.5VIN), the operation process can be as follows.

In first stage t0-t1, transistor QHS2 can be turned on, transistor QHS1 turned off, flying capacitor CF1 charged, and inductor current IL may rise. Balance switch S can be turned on, and balance capacitor CBL can connect in series with flying capacitor CF1. When ignoring the on-resistance, the sum of voltage VCBL on balance capacitor CBL and voltage VCF1 on flying capacitor CF1 may be equal to input voltage VIN, VCBL+VCF1=VIN.

In second stage t1-t2, transistor QHS1 can be turned off, transistor QHS2 turned off, flying capacitor CF1 may be open circuited, and inductor current IL can decrease. Balance switch S can be turned off, and balance capacitor CBL may be open circuited. At this time, the voltages on the flying capacitor CF1 and voltage VCBL on balance capacitor CBL may remain unchanged.

In third stage t2-t3, transistor QHS1 can be turned on, transistor QHS2 turned off, flying capacitor CF1 discharged, and inductor current IL may rise. Balance switch S can be turned on, and balance capacitor CBL can connect in parallel with flying capacitor CF1. When ignoring the on-resistance, voltage VCBL on balance capacitor CBL can be equal to voltage VCF1 on flying capacitor CF1, VCBL=VCF1.

In fourth stage t3-t4, transistor QHS1 may be turned off, transistor QHS2 turned off, flying capacitor CF1 open circuited, and inductor current IL may drop. Balance switch S can be turned off, and balance capacitor CBL may be open circuited. At this time, the voltage on flying capacitor CF1 and the voltage on balance capacitor CBL may remain unchanged.

Figure 4:
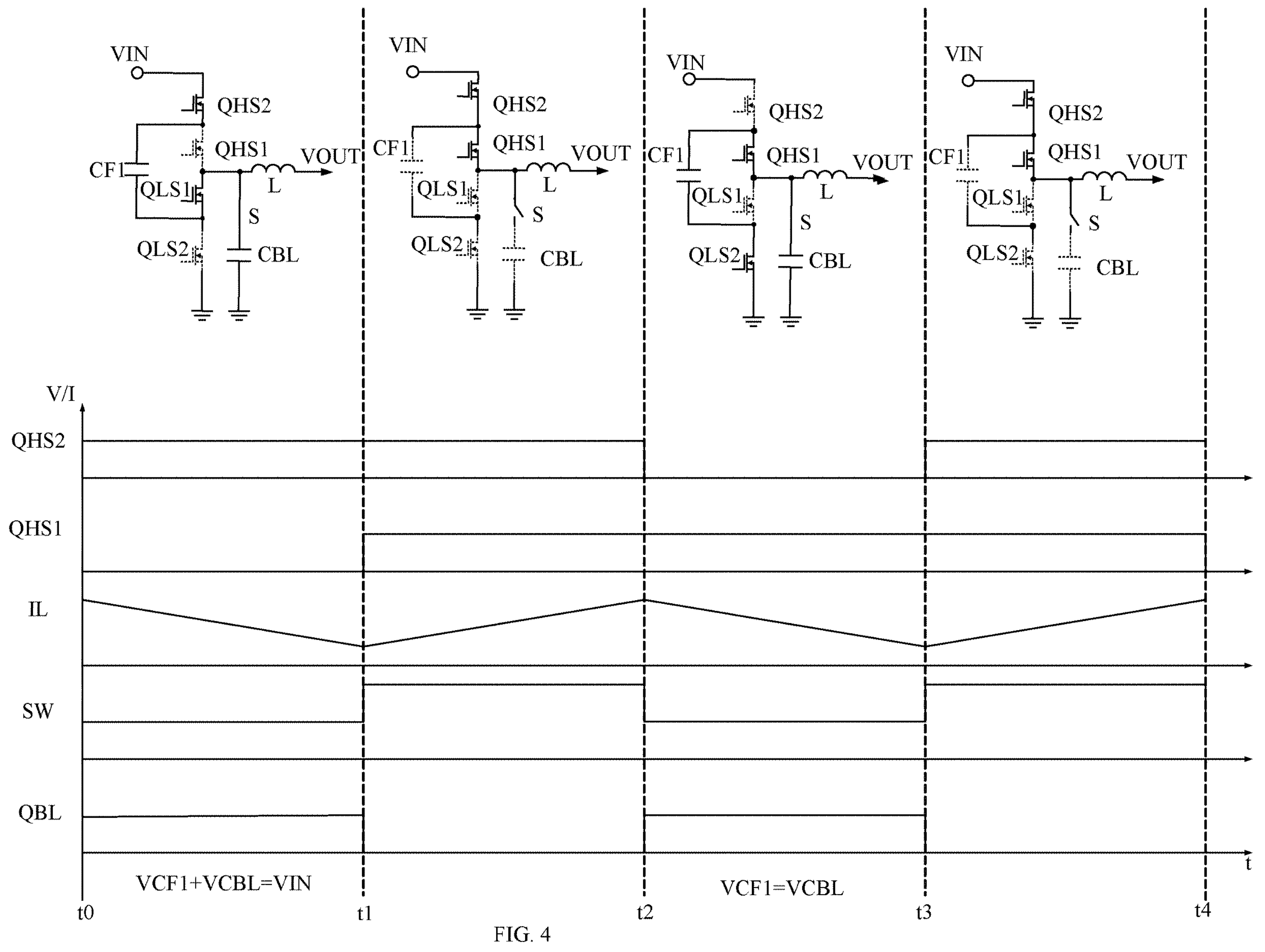
FIG. 4 is a waveform diagram of a second example operation of the first three-level converter when a duty cycle is relatively large, in accordance with embodiments of the present invention.

Referring now to FIG. 4, shown is a waveform diagram of a second example operation of the first three-level converter when a duty cycle is relatively large, in accordance with embodiments of the present invention. When the duty cycle is not less than 50%, that is, output voltage VOUT is not less than half of input voltage VIN (VOUT≥0.5VIN), the operation process is as follows. In first stage t0-t1, transistor QHS1 can be turned off, transistor QHS2 turned on, flying capacitor CF1 charged, and inductor current IL may decrease. Balance switch S can be turned on, and balance capacitor CBL can connect in series with flying capacitor CF1. When ignoring the on-resistance, the sum of voltage VCBL on balance capacitor CBL and voltage VCF1 on flying capacitor CF1 may be equal to input voltage VIN, VCBL+VCF1=VIN.

In second stage t1-t2, transistor QHS1 can be turned on, transistor QHS2 turned on, flying capacitor CF1 open circuited, and inductor current IL may increase. Balance switch S can be turned off, and balance capacitor CBL may be open circuited. At this time, the voltages on flying capacitor CF1 and balance capacitor CBL may remain unchanged.

In third stage t2-t3, transistor QHS1 can be turned on, transistor QHS2 turned off, flying capacitor CF1 discharged, and inductor current IL may decrease. Balance switch S1 can be turned on, and balance capacitor CBL can connect in parallel with flying capacitor CF1. When ignoring the on-resistance, voltage VCBL on balance capacitor CBL may be equal to voltage VCF1 on flying capacitor CF1, VCBL=VCF1.

In fourth stage t3-t4, transistor QHS1 can be turned on, transistor QHS2 turned on, flying capacitor CF1 open circuited, and inductor current IL may increase. Balance switch S can be turned off, and balance capacitor CBL may be open circuited. At this time, the voltages on flying capacitor CF1 and balance capacitor CBL may remain unchanged.

According to the above operation process, no matter whether the duty cycle is greater than 50%, the capacitor voltage relationship in the first stage is that the sum of voltage VCBL on balance capacitor CBL and voltage VCF1 on flying capacitor CF1 is equal to input voltage VIN (VCBL+VCF1=VIN), and in the third stage is that voltage VCBL on balance capacitor CBL is equal to voltage VCF1 on flying capacitor CF1 (VCBL=VCF1), respectively. When ignoring the on-resistance and capacitor voltage ripple, voltages VCF1 and VCBL on flying capacitor CF1 and flying capacitor CF1 can be equal to half of input voltage VIN (VIN=2*VCF1=2*VCBL). The process is similar to the charge pump with conversion ratio of 2:1, which may realize the balance of the flying capacitor voltage, such that the target voltage of ½VIN can be obtained.

Therefore, in different operation stages of an operation cycle, flying capacitor CF1 and balance capacitor CBL can selectively be connected in series or parallel. In this way, the voltage on balance capacitor CBL can be proportional to the voltage on flying capacitor CF1. Also, the voltage on balance capacitor CBL, the voltage on flying capacitor CF1, and input voltage VIN or output voltage VOUT, can be proportional, in order to realize balance control of the flying capacitor. The multi-level converter in particular embodiments may realize lossless balance, and as compared against traditional equalization approaches, this method may have advantages of simple control, high balance accuracy, good robustness, and wide adaptability.

Figure 5:
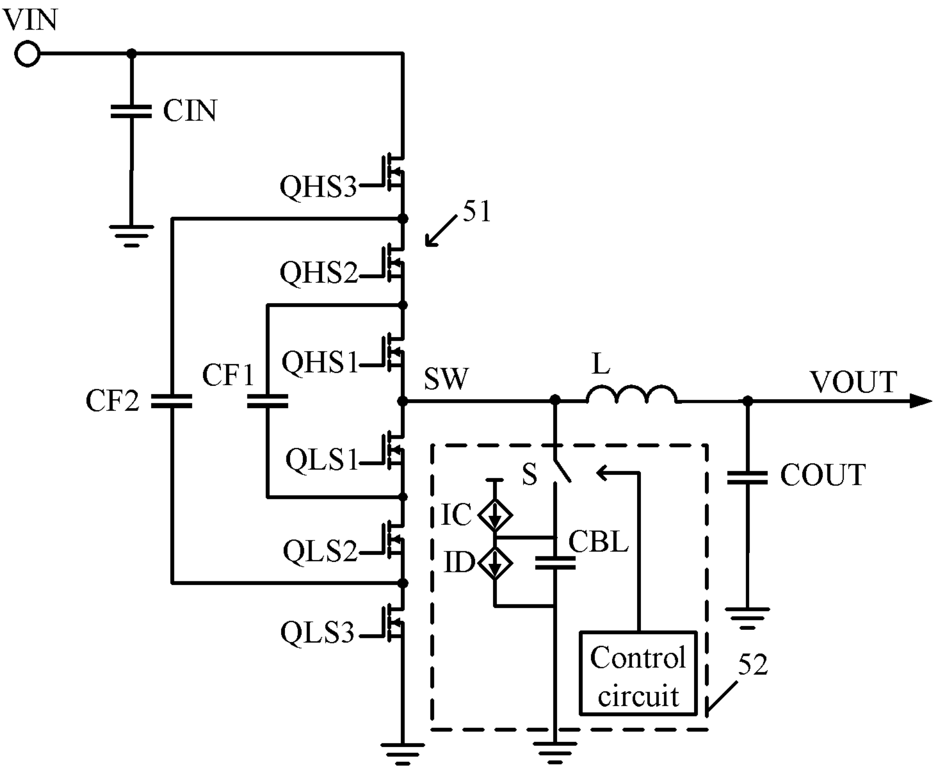
FIG. 5 is a schematic block diagram of a second example multi-level converter, in accordance with embodiments of the present invention.

Referring now to FIG. 5, shown is a schematic block diagram of a second example multi-level converter, in accordance with embodiments of the present invention. This example multi-level converter (e.g., a four-level converter) can include switch capacitor circuit 51, balance circuit 52, and inductive element L. Switch capacitor circuit 51 can perform DC conversion for input voltage VIN, and may include two flying capacitors CF1 and CF2, and six transistors QHS3, QHS2, QHS1, QLS1, QLS2, and QLS3 connected between input voltage VIN and the ground terminal. One terminal of transistor QHS1 can connect to one terminal of transistor QLS1 through flying capacitor CF1, and one terminal of transistor QHS2 can connect to one terminal of transistor QLS2 through flying capacitor CF2. Switch capacitor circuit 51 can also include filter capacitor CIN, which may connect to the input terminal of the four-level converter.

Balance circuit 52 can change the series-parallel relationship between the flying capacitor and the balance capacitor in the balance circuit in different operation stages of an operation cycle, in order to achieve balanced control of the flying capacitor. Balance circuit 52 can connect between common node SW and the ground terminal. In addition, transistors QHS3, QHS2, and QHS1 connected in series between input voltage VIN of the multi-level converter and common node SW may be configured as upper transistors. Also, transistors QLS3, QLS2, and QLS1 connected in series between common node SW and the ground terminal may be configured as lower transistors. In this example, balance circuit 52 can include balance switch S and balance capacitor CBL connected in series In one embodiment, when the balance switch is turned on, the balance capacitor can be coupled to at least one flying capacitor. Balance circuit 52 can also include a control circuit that can control the balance switch to be turned on and turned off. Further, when the voltage of common node SW is input voltage VIN of the multi-level converter or a zero voltage, balance switch S can be turned off. That is, when all the upper transistors are turned on or none of the upper transistors is turned on, balance switch S may be turned off. When balance switch S is turned off, balance circuit 52 can be disconnected from common node SW.

In this example, balance circuit 52 may be determine a time period during which balance capacitor CBL is coupled with at least one flying capacitor by monitoring the number of alternately conducting upper transistors in the three upper transistor of switch capacitor circuit 51, and monitoring a comparison result between a time period during which n upper transistors are simultaneously turned on and a time period during which the n−1 upper transistors are simultaneously turned on. Here, n is a positive integer (e.g., 3≥n≥1).

Figure 6:
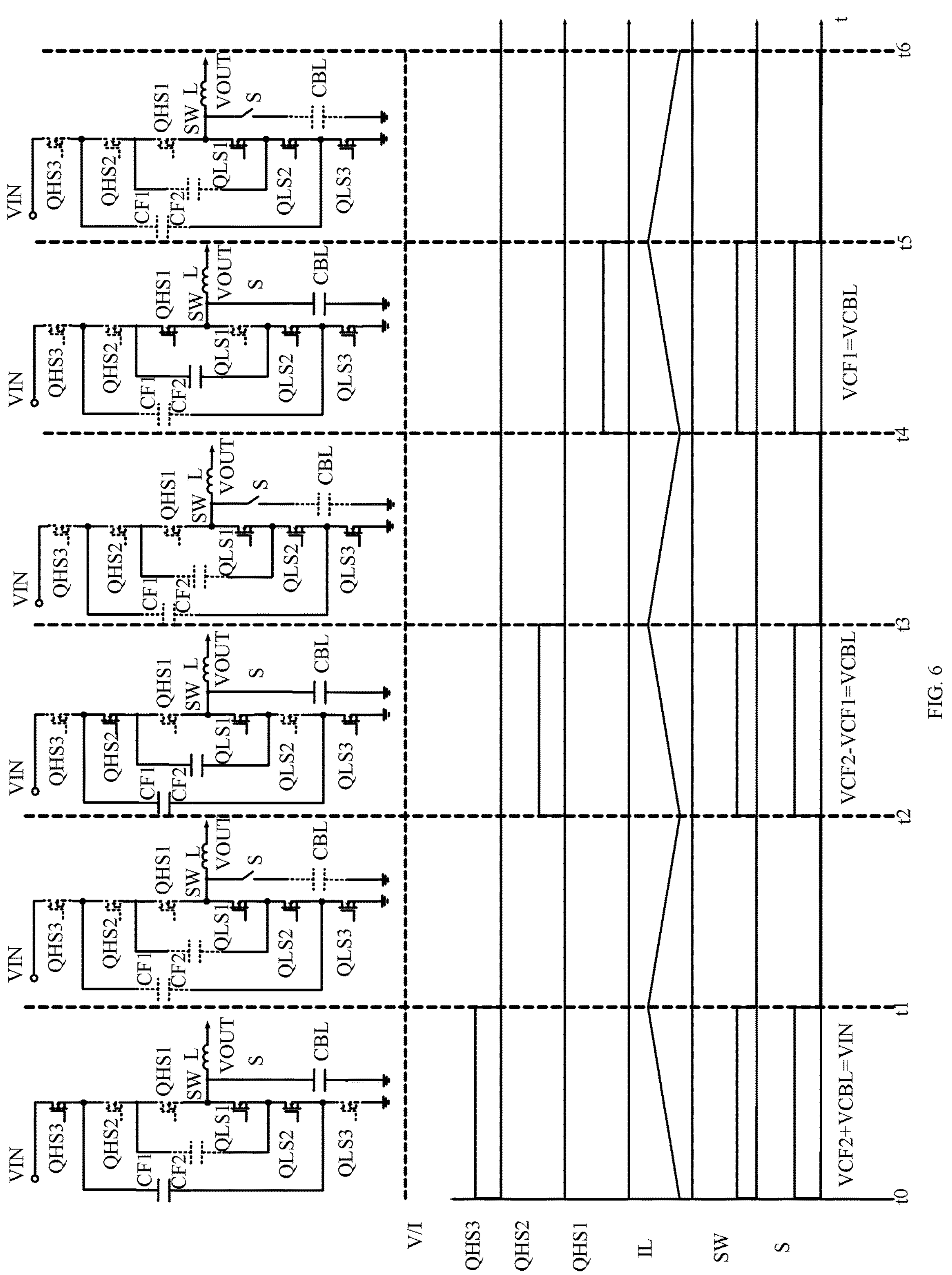
FIG. 6 is a waveform diagram of a first example operation of the second example multi-level converter, in accordance with embodiments of the present invention.

Referring now to FIG. 6, shown is a waveform diagram of a first example operation of the second example multi-level converter, in accordance with embodiments of the present invention. The following is combined with the waveform diagrams (see, e.g., FIGS. 5-9) to explain the voltage balance principle and operation process of the three-level converter. Here, transistors QHS1 and QLS1 can be turned on in complementary fashion, transistors QHS2 and QLS2 may be turned on in complementary fashion, and transistor QHS3 and QLS3 can be turned on in complementary fashion as an example to illustrate the operation principle and process. Each operation cycle of the three-level converter can include six stages, and it may be assumed that the capacity of flying capacitors CF1 and CF2 is large enough such that the voltages of flying capacitors CF1 and CF2 does not change significantly during the charging and discharging phase. When the duty cycle is less than ⅓, that is, output voltage VOUT is less than one third of input voltage VIN (VOUT<⅓VIN), the operation process can be as follows.

In first stage t0-t1, transistor QHS3 can be turned on, transistor QHS2 turned off, transistor QHS1 turned off, flying capacitor CF2 charged, flying capacitor CF1 open circuited, and inductor current IL may rise. Balance switch S1 can be turned on, such that balance capacitor CBL can connect to common node SW. When ignoring the on-resistance, the sum of voltage VCBL on balance capacitor CBL and voltage VCF2 on flying capacitor CF2 may be equal to input voltage VIN (VCBL+VCF2=VIN).

In second stage t1-t2, transistors QHS3, QHS2, and QHS1 can be turned off, flying capacitor CF2 open circuited, flying capacitor CF1 open circuited, and inductor current IL may decrease. Balance switch S can be turned off, and balance capacitors CBL may be open circuited. At this time, voltage VCF2 on flying capacitor CF2, voltage VCF1 on flying capacitor CF1, and voltage VCBL on balance capacitor CBL may remain unchanged.

In third stage t2-t3, transistor QHS3 can be turned off, transistor QHS2 turned on, transistor QHS1 turned off, flying capacitor CF2 discharged, flying capacitor CF1 charged, and inductor current IL may rise. Balance switch S can be turned on, such that balance capacitor CBL can connect to common node SW. At this time, the difference of voltage VCF2 and voltage VCF1 may be equal to voltage VCBL on balance capacitor CBL (VCF2−VCF1=VCBL).

In fourth stage t3-t4, transistors QHS3, QHS2, and QHS1 can be turned off, the voltage of common node SW may be zero, flying capacitors CF2 and CF1 can be open circuited, and inductor current IL can decrease. Balance switch S can be turned off, and balance capacitors CBL open circuited. At this time, voltage VCF2 on flying capacitor CF2, voltage VCF1 on flying capacitor CF1, and voltage VCBL on balance capacitor CBL may remain unchanged.

In fifth stage t4-t5, transistor QHS3 can be turned off, transistor QHS2 turned off, transistor QHS1 turned on, flying capacitor CF2 open circuited, flying capacitor CF1 discharged, and inductor current IL may rise. Balance switch S can be turned on, such that balance capacitor CBL can connect to common node SW. At this time, voltage VCF1 on flying capacitor CF1 may be equal to voltage VCBL on balance capacitor CBL (VCF1=VCBL).

In sixth stage t5-t6, transistors QHS3, QHS2, and QHS1 can be turned off, flying capacitors CF2 and CF1 may be open circuited, and inductor current IL can decrease. Balance switch S may be turned off, and balance capacitor CBL can be open circuited. At this time, voltage VCF2 on flying capacitor CF2, voltage VCF1 on flying capacitor CF21, and voltage VCBL on balance capacitor CBL remain unchanged.

According to the above equation, the capacitance-voltage relationship in the first stage, the third stage, and the fifth stage may satisfy: VIN=VCBL+VCF2, VCF2−VCF1=VCBL, VCF1=VCBL, respectively. When ignoring the conduction impedance and capacitance voltage ripple, the following equation can be satisfied: VIN=3/2VCF2=3VCF1=3VCBL. The process is similar to the charge pump with conversion ratio of 3:1, which may realize balance of the flying capacitor voltage, such that the target voltage of ⅓VIN or ⅔VIN can be obtained, where VIN is the input voltage of the multilevel converter.

Further, under the condition of duty cycle D less than ⅓(D<⅓), in each operation cycle, the time period during which one upper transistor is turned on and the time period during which no upper transistor is turned on can be alternated. Although the conduction time of one upper transistor is less than that of no upper transistor, but the balance switch can be turned off when no upper transistor is turned on. Therefore, after adjusting the voltage on balance capacitor CBL to VIN/3, balance switch S can be turned on when only one upper transistor is turned on, and balance switch S may be turned off during the operation cycle except for a time period that no upper transistor is turned on.

Figure 7:
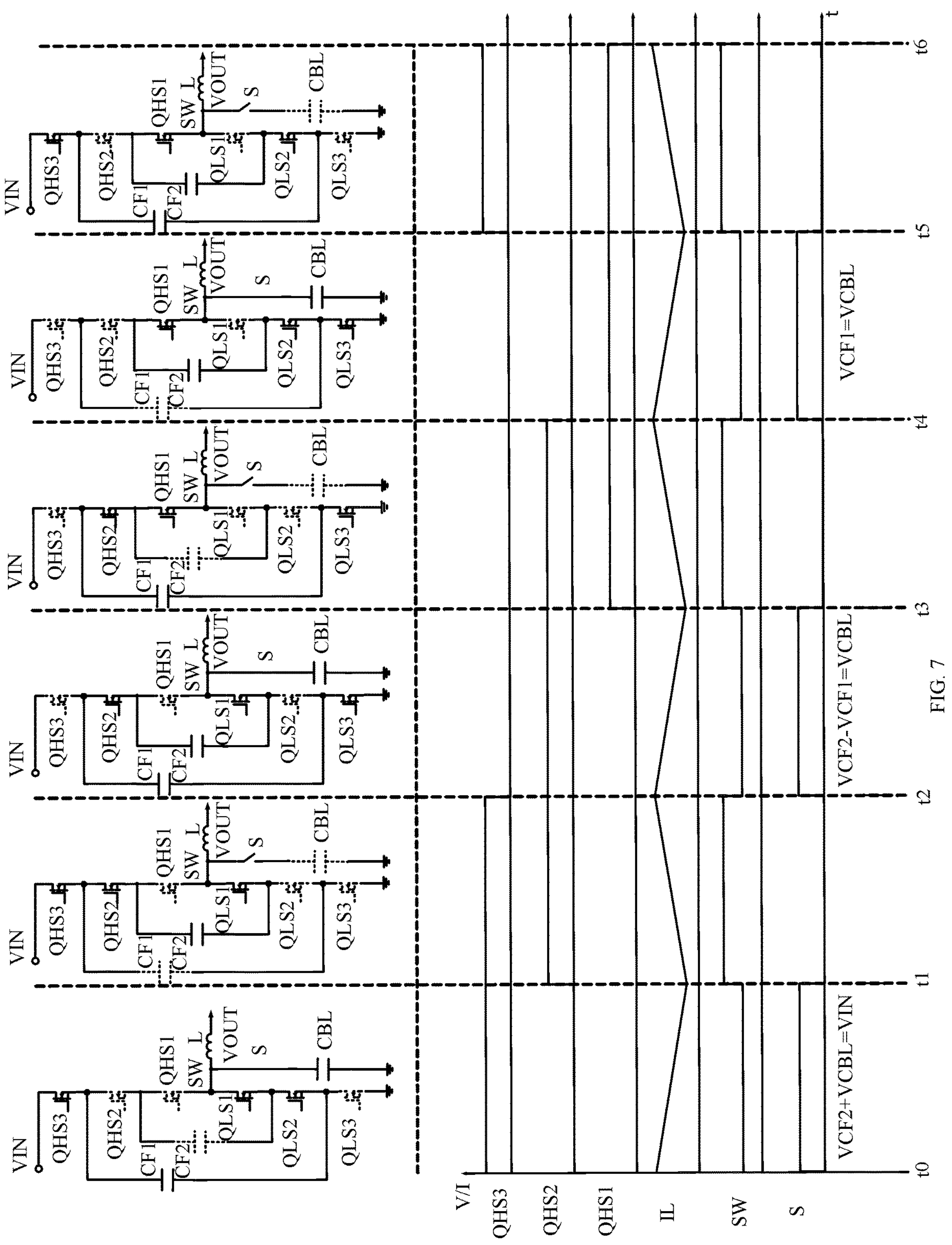
FIG. 7 is a waveform diagram of a second example operation of the second example multi-level converter, in accordance with embodiments of the present invention.

Referring now to FIG. 7, shown is a waveform diagram of a second example operation of the second example multilevel converter, in accordance with embodiments of the present invention. When the duty cycle is not less than ⅓ and less than ½, that is, output voltage VOUT is not less than one third of input voltage VIN and less than half of input voltage VIN (½VIN>VOUT≥⅓VIN), the operation process can be as follows. In first stage t0-t1, transistor QHS3 may be turned on, transistor QHS2 turned off, transistor QHS1 turned off, lying capacitor CF2 charged, flying capacitor CF1 open circuited, and inductor current IL can decrease. Balance switch S may be turned on so that balance capacitor CBL can connect to common node SW. At this time, the sum of voltage VCBL on balance capacitor CBL and voltage VCF2 on flying capacitor CF2 may be equal to input voltage VIN (VCBL1+VCF2=VIN), and voltages VCF1 and VCBL may remain unchanged.

In second stage t1-t2, transistor QHS3 can be turned on, transistor QHS2 turned on, transistor QHS1 turned off, flying capacitor CF2 open circuited, flying capacitor CF1 charged, and inductor current IL may rise. Balance switch S can be turned off, and balance capacitor CBL may be open circuited. At this time, voltage VCBL on balance capacitor CBL, voltage VCF1 on flying capacitor CF1, and voltage VCF2 on flying capacitor CF2 may remain unchanged.

In third stage t2-t3, transistor QHS3 can be turned off, transistor QHS2 turned on, transistor QHS1 turned off, flying capacitor CF2 discharged, flying capacitor CF1 charged, and inductor current IL may decrease. Balance switch S can be turned on, such that balance capacitor CBL can connect to common node SW. At this time, the difference of voltage VCF2 and voltage VCF1 can be equal to voltage VCBL on balance capacitor CBL (VCF2−VCF1=VCBL).

In fourth stage t3-t4, transistor QHS3 can be turned off, transistor QHS2 turned on, transistor QHS1 turned on, flying capacitor CF2 discharged, flying capacitor CF1 open circuited, and inductor current IL may rise. Balance switch S can be turned off, such that balance capacitor CBL is open circuited. At this time, voltage VCBL on balance capacitor CBL, voltage VCF1 on flying capacitor CF1, and voltage VCF2 on flying capacitor CF2 may remain unchanged.

In fifth stage t4-t5, transistor QHS3 can be turned off, transistor QHS2 turned off, transistor QHS1 turned on, flying capacitor CF2 open circuited, flying capacitor CF1 discharged, and inductor current IL may decrease. Balance switch S can be turned on, such that balance capacitor CBL can connect to common node SW. At this time, voltage VCF1 on flying capacitor CF1 may be equal to voltage VCBL on balance capacitor CBL1 (VCF1=VCBL).

In sixth stage t5-t6, transistor QHS3 can be turned on, transistor QHS2 turned off, transistor QHS1 turned on, flying capacitor CF2 charged, flying capacitor CF1 discharged, and inductor current IL may rise. Balance switch S can be turned off, and balance capacitor CBL may be open circuited. From the analysis of the above operating process, the capacitance-voltage relationship in the first stage, the third stage, and the fifth stage may satisfy: VIN=VCBL+VCF2, VCF2−VCF1=VCBL, VCF1=VCBL, respectively. When ignoring the conduction impedance and capacitance voltage ripple, there can be: VIN=3/2VCF2=3VCF1=3VCBL. The process is similar to the charge pump with conversion ratio of 3:1, which may realize balance of the flying capacitor voltage, such that the target voltage of ⅓VIN or ⅔VIN can be obtained, where VIN is the input voltage of the multilevel converter.

Further, under the condition of duty cycle not less than ⅓ and less than ½ (½>D≥⅓), in each operation cycle, the time period during which one upper transistor is turned on and the time period during which two upper transistor are turned on can be alternated. Further, the time period during which two upper transistor are turned on can be less than the time period during which one upper transistor is turned on. Thus, after adjusting the voltage on balance capacitor CBL to VIN/3, balance switch S can be turned on when only one upper transistor is turned on, and balance switch S may be turned off during the operation cycle except for a time period that two upper transistor are turned on.

Figure 8:
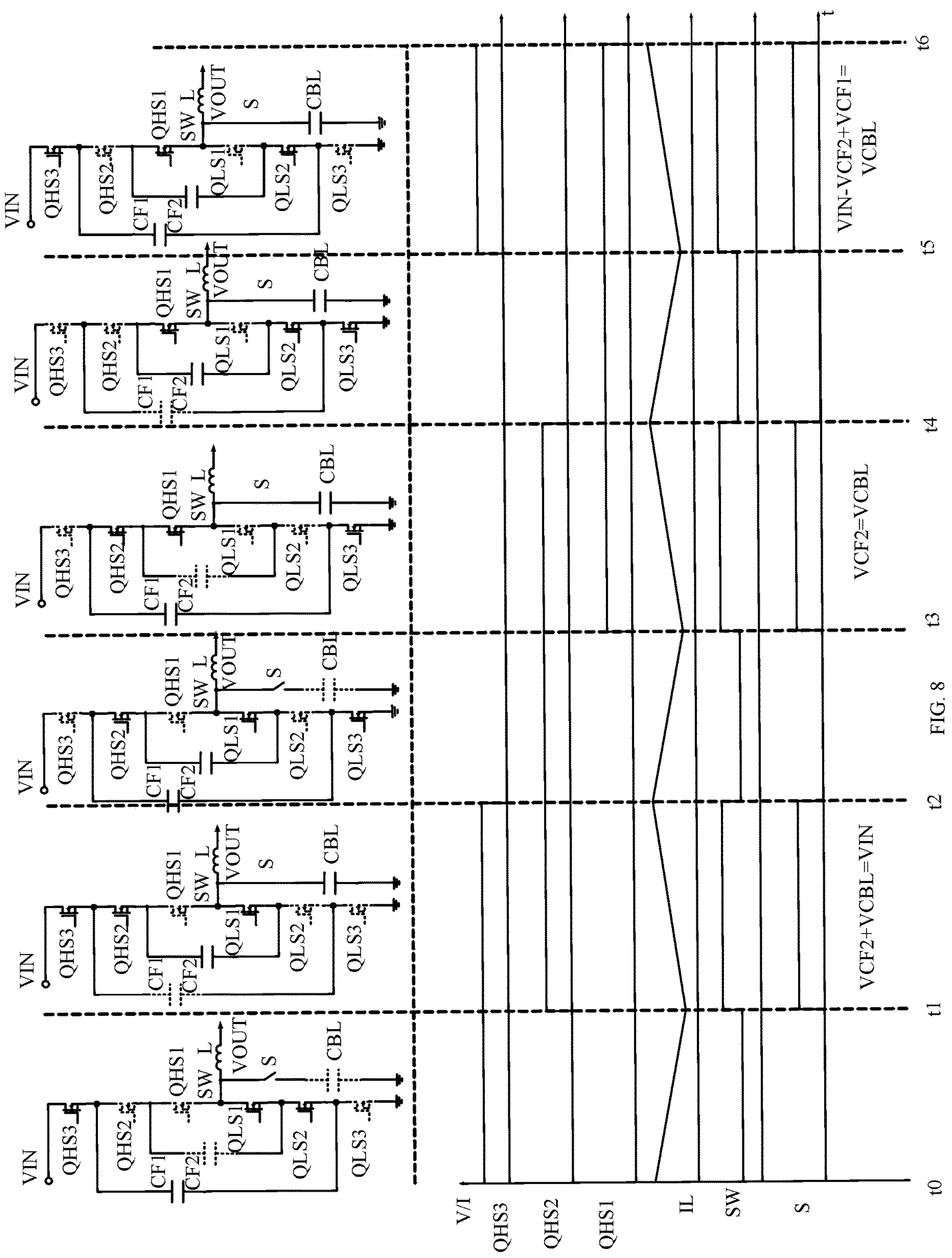
FIG. 8 is a waveform diagram of a third example operation of the second example multi-level converter, in accordance with embodiments of the present invention.

Referring now to FIG. 8, shown is a waveform diagram of a third example operation of the second example multi-level converter, in accordance with embodiments of the present invention. When duty cycle D is not less than ½ and is less than ⅔ (⅔>D≥½), that is, output voltage VOUT is not less than half of input voltage VIN and is less than two thirds of input voltage VIN (⅔VIN>VOUT≥½VIN), the operation process may be as follows. In first stage t0-t1, transistor QHS3 can be turned on, transistor QHS2 turned off, transistor QHS1 turned off, flying capacitor CF2 charged, flying capacitor CF1 open circuited, and inductor current IL can rise. Balance switch S may be turned off, and balance capacitor CBL can be open circuited. When ignoring the on-resistance, voltage VCF2 on flying capacitor CF2, voltage VCF1 on flying capacitor CF1, and voltage VCBL on balance capacitor CBL may remain unchanged.

In second stage t1-t2, transistor QHS3 can be turned on, transistor QHS2 turned on, transistor QHS1 turned off, flying capacitor CF2 open circuited, flying capacitor CF1 charged, and inductor current IL may rise. Balance switch S can be turned on, and balance capacitor CBL can connect to common node SW. When ignoring the on-resistance, the sum of voltage VCBL on balance capacitor CBL and voltage VCF1 on flying capacitor CF1 can be equal to input voltage VIN (VCBL+VCF1=VIN).

In third stage t2-t3, transistor QHS3 can be turned off, transistor QHS2 turned on, transistor QHS1 turned off, flying capacitor CF2 discharged, flying capacitor CF1 charged, and inductor current IL may drop. Balance switch S can be turned off, and balance capacitor CBL may be open circuited. When ignoring the on-resistance, voltage VCF2 on flying capacitor CF2, voltage VCF1 on flying capacitor CF1, and voltage VCBL on balance capacitor CBL may remain unchanged.

In fourth stage t3-t4, transistor QHS3 can be turned off, transistor QHS2 turned on, transistor QHS1 turned on, flying capacitor CF2 discharged, flying capacitor CF1 open circuited, and inductor current IL may rise. Balance switch S can be turned on, and balance capacitor CBL can connect to common node SW. When ignoring the on-resistance, voltage VCF2 on flying capacitor CF2 may be equal to voltage VCBL on balance capacitor CBL (VCF2=VCBL).

In fifth stage t4-t5, transistor QHS3 can be turned off, transistor QHS2 turned off, transistor QHS1 turned on, flying capacitor CF2 open circuited, flying capacitor CF1 discharged, and inductor current IL may decrease. Balance switch S can be turned off, and balance capacitor CBL may be open circuited. When ignoring the on-resistance, voltage VCF2 on flying capacitor CF2, voltage VCF1 on flying capacitor CF1, and voltage VCBL on balance capacitor CBL may remain unchanged.

In sixth stage t5-t6, transistor QHS3 can be turned on, transistor QHS2 turned off, transistor QHS1 turned on, capacitor CF2 charged, capacitor CF1 discharged, and inductor current IL may rise. Balance switch S can be turned on, and balance capacitor CBL can connect to common node SW. When ignoring the on-resistance, the sum of the difference between input voltages VIN, VCF2, and VCF1 may be equal to voltage VCBL on balance capacitor CBL (VIN−VCF2+VCF1=VCBL).

From the analysis of the above working process, the capacitance-voltage relationship in the second stage, the fourth stage, and the sixth stage may respectively satisfy: VIN=VCF1+VCBL, VCF2=VCBL, VIN−VCF2+VCF1−VCBL. When ignoring the conduction impedance and capacitance voltage ripple, the following equation may be satisfied: VIN=3/2VCF2−3VCF1=3/2VCBL. The process is similar to the charge pump with conversion ratio of 3:2, which may realize equalization of the flying capacitor voltage, such that the target voltage of ⅓VIN or ⅔VIN can be obtained.

In this example, under the operating condition of duty cycle D being not less than ½ and less than ⅔ (⅔>D≥½), the stage that one upper transistor is turned on and the stage that two upper transistors are simultaneously turned on can be controlled alternately. Further, the time period during which two upper transistors are turned on simultaneously can be greater than the time period during which only one upper transistor is turned on, such that after the voltage on balance capacitor CBL is adjusted to 2VIN/3, balance switch S may be turned on only when two upper transistors are turned on simultaneously. Also, during the operation cycle except for the time period that one upper transistor is turned on, balance switch S can be turned off.

Figure 9:
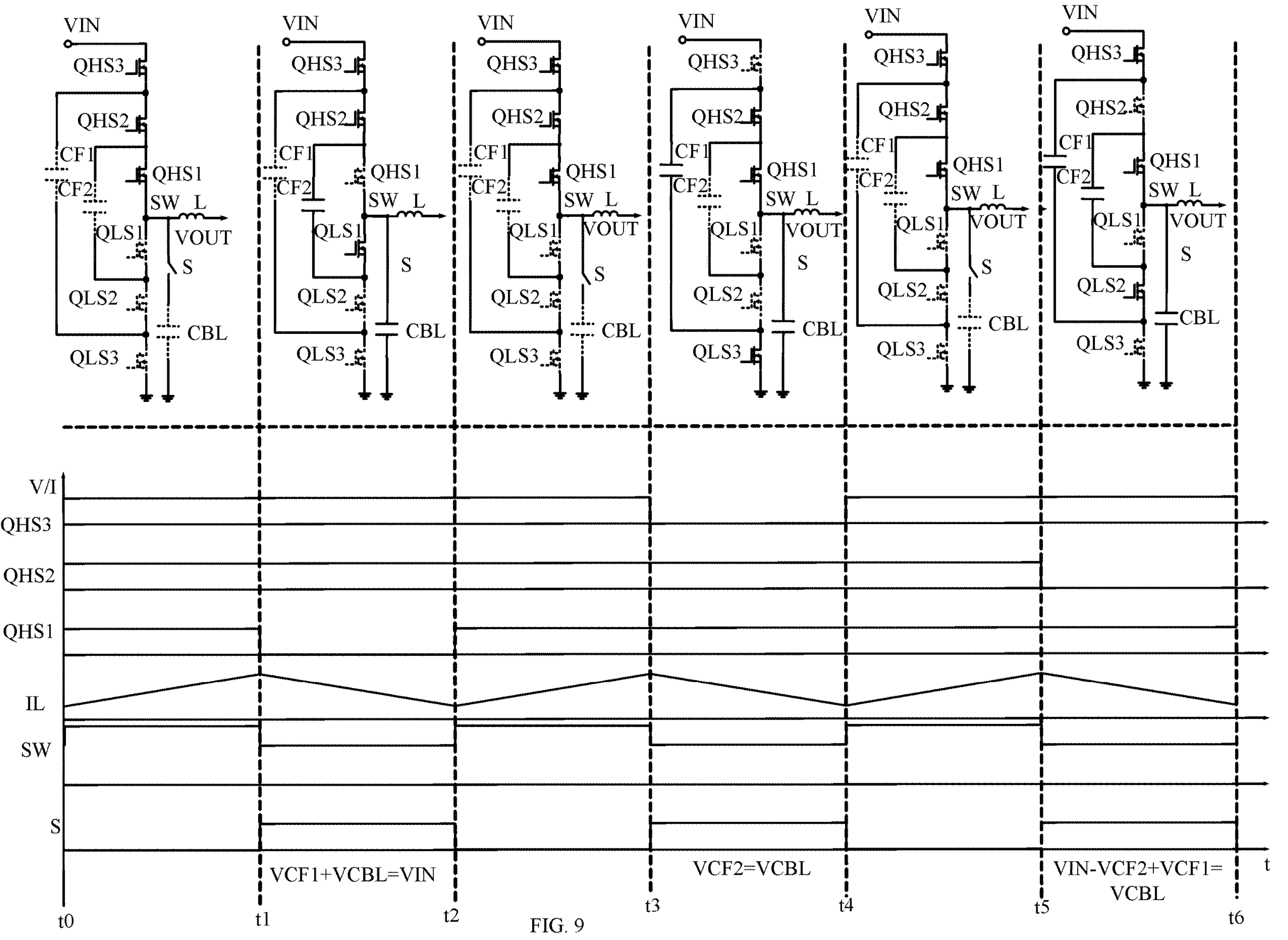
FIG. 9 is a waveform diagram of a fourth example operation of the second example multi-level converter, in accordance with embodiments of the present invention.

Referring now to FIG. 9, shown is a waveform diagram of a fourth example operation of the second example multi-level converter, in accordance with embodiments of the present invention. When duty cycle D is not less than ⅔ (D≥⅔), that is, output voltage VOUT is not less than two thirds of input voltage VIN (VOUT≥⅔VIN), the operation process can be as follows. In first stage t0-t1, transistor QHS3 can be turned on, transistor QHS2 turned on, transistor QHS1 turned on, flying capacitor CF2 open circuited, flying capacitor CF1 open circuited, and inductor current IL can rise. Balance switch S can be turned off, and balance capacitor CBL may be open circuited. When ignoring the on-resistance, voltage VCF2 on flying capacitor CF2, voltage VCF1 on flying capacitor CF1, and voltage VCBL on balance capacitor CBL may remain unchanged.

In second stage t1-t2, transistor QHS3 can be turned on, transistor QHS2 turned on, transistor QHS1 turned off, flying capacitor CF2 open circuited, flying capacitor CF1 charged, and inductor current IL may drop. Balance switch S can be turned on, and balance capacitor CBL can connect to common node SW. When ignoring the on-resistance, the sum of voltage VCBL on balance capacitor CBL and voltage VCF1 on flying capacitor CF1 may be equal to input voltage VIN (VCBL+VCF1=VIN).

In third stage t2-t3, transistor QHS3 can be turned on, transistor QHS2 turned on, transistor QHS1 turned on, flying capacitor CF2 open circuited, flying capacitor CF1 open circuited, and the inductor current may rise. Balance switch S can be turned off, and balance capacitor CBL may be open circuited. When ignoring the on-resistance, voltage VCF2 on flying capacitor CF2, voltage VCF1 on flying capacitor CF1, and voltage VCBL on balance capacitor CBL may remain unchanged.

In fourth stage t3-t4, transistor QHS3 can be turned off, transistor QHS2 turned on, transistor QHS1 turned on, flying capacitor CF2 discharged, flying capacitor CF1 open circuited, and inductor current IL may drop. Balance switch S can be turned on, and balance capacitor CBL can connect to common node SW. When ignoring the on-resistance, voltage VCF2 on flying capacitor CF2 may be equal to voltage VCBL on balance capacitor CBL (VCF2=VCBL).

In fifth stage t4-t5, transistor QHS3 can be turned on, transistor QHS2 turned on, transistor QHS1 turned on, capacitor CF2 open circuited, flying capacitor CF1 open circuited, and inductor current IL can rise. Balance switch S can be turned off, and balance capacitor CBL may be open circuited. When ignoring the on-resistance, voltage VCF2 on flying capacitor CF2, voltage VCF1 on flying capacitor CF1, and voltage VCBL on balance capacitor CBL may remain unchanged.

In sixth stage t5-t6, transistor QHS3 can be turned on, transistor QHS2 turned off, transistor QHS1 turned on, flying capacitor CF2 charged, flying capacitor CF1 discharged, and inductor current inductor current IL may drop. Balance switch S can be turned on, and balance capacitor CBL can connect common node SW. When ignoring the on-resistance, the sum of the difference between input voltage VIN and voltage VCF2 and voltage VCF1 may be equal to voltage VCBL on balance capacitor CBL (VIN−VCF2+VCF1=VCBL).

From the analysis of the above working process, the capacitance-voltage relationship in the second stage, the fourth stage, and the sixth stage may respectively satisfy:

VIN=VCF1+VCBL, VCF2=VCBL, VIN−VCF2+VCF1=VCBL. When ignoring the conduction impedance and capacitance voltage ripple, the following equation may be satisfied: VIN=3/2VCF2=3VCF1=3/2VCBL. The process is similar to the charge pump with conversion ratio of 3:2, which realizes the equalization of the flying capacitor voltage, such that the target voltage of ⅓VIN or ⅔VIN can be obtained.

In this example, under the operating condition of the duty cycle D being not less than ⅔ (D≥⅔), the stage that three upper transistor is turned on and the stage that two upper transistors are simultaneously turned on can be controlled alternately. Further, the time period during which three upper transistors are turned on simultaneously can be greater than the time period during which two upper transistor are turned on, such that after the voltage on balance capacitor CBL is adjusted to 2VIN/3, balance switch S is turned on only when two upper transistors are turned on simultaneously. Also, during the operation cycle except for the time period that three upper transistor are turned on, balance switch S can be turned off.

In this example, balance circuit 52 can adjust the voltage on balance capacitor CBL such that VCF2=2VCF1=⅔VIN, regardless of the duty cycle. The four-level converter in particular embodiments may realize balance of the voltage of the flying capacitor, such that the voltage of the flying capacitor can remain at a target value. The four-level converter of particular embodiments can change the series-parallel relationship between the flying capacitor and the balance capacitor in the balance circuit in different operation stages of an operation cycle, such that a proportional relationship between the voltage on the flying capacitor and the voltage on the balance capacitor may be generated. Also, a proportional relationship between the voltage on the balance capacitor, the voltage on the flying capacitor, and the input voltage or output voltage may be generated, in order to realize balance control of the flying capacitor. In this way, particular embodiments may realize lossless equalization, and have advantages of simple control, high equalization precision, good robustness, wide adaptability, etc., as compared against traditional equalization approaches.

Figure 10:
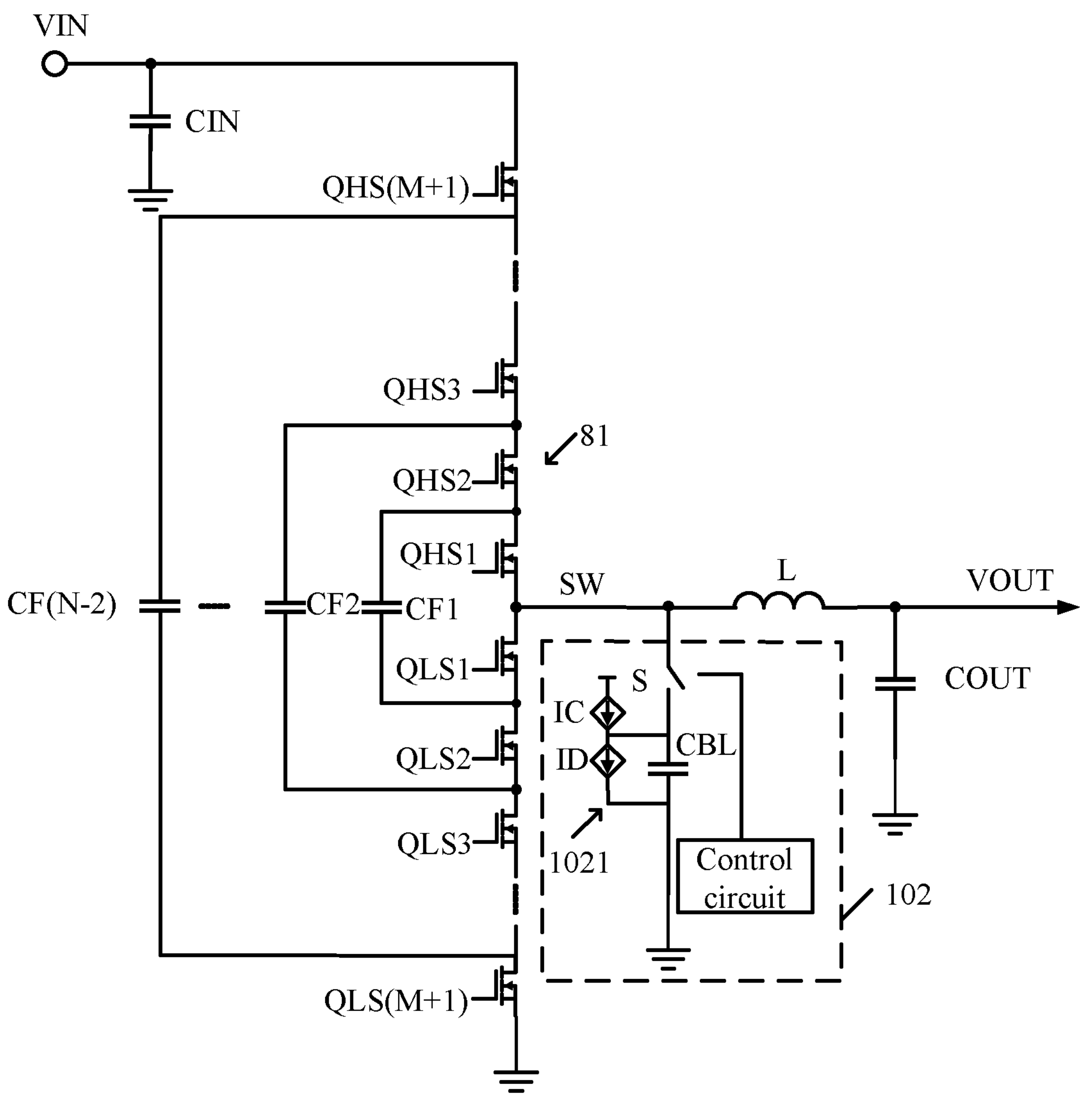
FIG. 10 is a schematic block diagram of a third example multi-level converter, in accordance with embodiments of the present invention.

Referring now to FIG. 10, shown is a schematic block diagram of a third example multi-level converter, in accordance with embodiments of the present invention. This particular example multi-level converter (e.g., an N-level converter) can include switch capacitor circuit 101, balance circuit 102, and inductive element L. Switch capacitor circuit 101 can include M flying capacitors and 2*(M+1) transistors, where M is a positive integer and M+2=N. Also, 2*(M+1) transistors can connect in series between input voltage VIN and the ground terminal of the N-level converter. One terminal of transistor QHSn can connect to one terminal of transistor QLSn through flying capacitor CFn. Switch capacitor circuit 101 can also include filter capacitor CIN. Filter capacitor CIN can connect to input voltage VIN of the N-level converter, whereby n is a positive integer greater than or equal to 1, and less than or equal to M.

Balance circuit 102 can realize the balance control of the flying capacitor by changing the series-parallel relationship between the flying capacitor and the balance capacitor in the balance circuit in different operation stages of an operation cycle. Balance circuit 102 can connect between common node SW and the ground terminal. In addition, (M+1) transistors connected in series between input voltage VIN of the multi-level converter and common node SW may be configured as upper transistors, and transistors QHS (M+1), . . . , QHS3, QHS2, and QHS1 as upper transistors. Also, (M+1) transistors connected in series between common node SW and the ground terminal can be configured as lower transistors, and transistors QLS (M+1), . . . , QLS3, QLS2, and QLS1 as lower transistors.

In one example, balance circuit 102 can include balance switch S and balance capacitor CBL connected in series. For example, balance switch S1 can be configured as a bidirectional current blocking transistor. When balance switch S is turned on, balance capacitor CBL can connect to at least one flying capacitor. Further, when the voltage on common node SW is equal to input voltage VIN or a zero voltage, balance switch S may be turned off, and balance circuit 102 disconnected from common node SW. That is, when (M+1) upper transistors are turned on or no upper transistor is turned on, balance switch S in balance circuit 102 can be turned off, and balance circuit 102 essentially disconnected from common node SW.

In the case of steady-state operation, in an operation cycle the N-level converter of particular embodiments can control a first time period during which n upper transistors among (M+1) upper transistors are simultaneously turned on and a second time period during which (n−1) upper transistors among (M+1) upper transistors are simultaneously turned on alternately. Here, the value of n is determined according to duty cycle D of the N-level converter, and n is a positive integer (e.g., M+1≥n≥1). Further, balance circuit 102 may determine a time period for coupling balance capacitor CBL to at least one flying capacitor according to the number of alternately conducting upper transistors among the (M+1) upper transistors. In addition, according to a comparison result between a time period during which n upper transistors are turned on simultaneously and a time period during which (n−1) upper transistors are turned on simultaneously, the time period for coupling balancing capacitor CBL to at least one of the flying capacitors may be determined.

When in an operation cycle the time period during which n upper transistors are turned on simultaneously is greater than the time period during which (n−1) upper transistors are turned on simultaneously, after the voltage on balance capacitor CBL is adjusted to VIN*n/(M+1) or VOUT*n/(M+1), balance switch S can be turned on when only n upper transistors are turned on simultaneously, and balance switch S may be turned off during the time period except the time period of n upper transistors turned on simultaneously. Here, VIN and VOUT are respectively input voltage and output voltage of the N-level converter. When the time period during which n upper transistors are turned on simultaneously is less than the time period during which (n−1) upper transistors are turned on simultaneously, the voltage on balance capacitor CBL may be adjusted to VIN*(n−1)/(M+1) or VOUT*(n−1)/(M+1), balance switch S can be turned on when only (n−1) upper transistors are turned on simultaneously, and balance switch S may be turned off during the time period except the time period of (n−1) upper transistors turned on simultaneously. Here, e.g., (M+1)<n<1.

In one embodiment, when in an operation cycle a first time period during which one upper transistor is turned on and a second time period during which none upper transistor is turned on alternately, the voltage on balance capacitor CBL can be adjusted to VIN*M/(M+1) or VOUT*M/(M+1), balance switch S may be turned on when only one upper transistor is turned on simultaneously, and balance switch S can be turned off during the time period of the operation cycle except the time period of one upper transistor turned on. In one embodiment, when in an operation cycle a first time period during which (M+1) upper transistors are turned on and a second time period during which M upper transistors are turned on alternately, the voltage on balance capacitor CBL can be adjusted to VIN*M/(M+1) or VOUT*M/(M+1), balance switch S may be turned on when M upper transistors are turned on simultaneously, and balance switch S can be turned off during the operation cycle except for a time period that (M+1) upper transistors are turned on.

It should be understood that when the multilevel converter is a step-down converter, the voltage on balance capacitor CBL may be adjusted to a value related to input voltage VIN. When the multilevel converter is a boost converter, the voltage on balance capacitor CBL can be adjusted to a value related to output voltage VOUT. For example, balance circuit 102 can also include a control circuit that can control balance switch S to be turned on and off. The control circuit may determine the conduction period of the balance switch according to the number of the upper transistors that are turned on alternately among (M+1) upper transistors, and a comparison result between a time period during which n upper transistors are simultaneously turned on and a time period during which (n−1) upper transistors are simultaneously turned on.

Balance circuit 102 can also include charging and discharging circuit 1021 for adjusting the voltage on balance capacitor CBL. For example, charging and discharging circuit 1021 can include current source IC and current source ID connected in series. One terminal of current source IC can connect to a supply voltage, and current source ID can connect in parallel with both terminals of balance capacitor CBL. For example, current source IC can charge balance capacitor CBL, and current source ID can discharge balance capacitor CBL.

In the above examples, the N-level converter can change the series-parallel relationship between the flying capacitor and the balance capacitor in the balance circuit in different operation stages of an operation cycle, such that a proportional relationship between the voltage on the flying capacitor and the voltage on the flying capacitor is generated, and a proportional relationship between the voltage on the balancing capacitor, the voltage on the flying capacitor, and the input voltage or the output voltage is generated, in order to realize the balance control of the flying capacitor. In this way, particular embodiments may realize lossless equalization, and have advantages of simple control, high equalization precision, good robustness, wide adaptability, etc., as compared against traditional equalization approaches.

Figure 11:
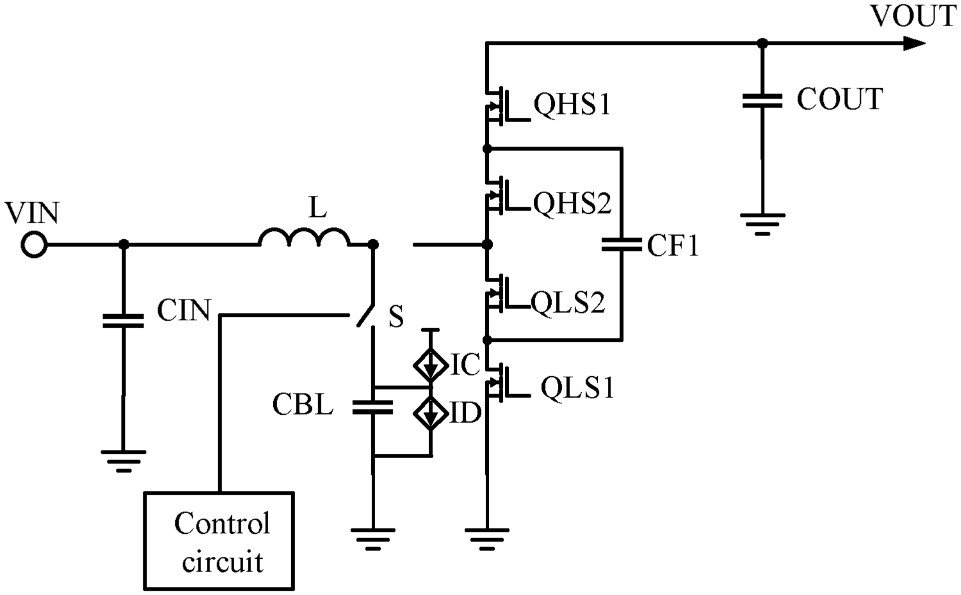
FIG. 11 is a schematic block diagram of a fourth example multi-level converter, in accordance with embodiments of the present invention.

Referring now to FIG. 11, shown is a schematic block diagram of a fourth example multi-level converter, in accordance with embodiments of the present invention. The difference from the first example multi-level converter is that the three-level converter is a three-level boost converter, and other circuit structures and operating principles can be substantially similar.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A multi-level converter, comprising: a) a switch capacitor circuit having M flying capacitors and 2*(M+1) transistors, wherein M is a positive integer; b) an inductive element; c) a balance circuit coupled to a common node of the switch capacitor circuit and the inductive element, and comprising a balance switch and a balance capacitor; d) wherein after a voltage of the balance capacitor is adjusted to a preset value, the flying capacitor and the balancing capacitor are coupled to each other in one of series and parallel connections by controlling the balance switch to be selectively turned on and off: and e) wherein the balance circuit comprises the balance switch and the balance capacitor coupled in series, and the balance capacitor is coupled to at least one of the flying capacitors when the balance switch is turned on.

2. The multi-level converter of claim 1, wherein the balance circuit is coupled between the common node and a ground terminal, wherein (M+1) transistors coupled sequentially in series between an input voltage or an output voltage of the multi-level converter and the common node are configured as upper transistors, and (M+1) transistors coupled sequentially in series between the common node and the ground terminal are configured as lower transistors.

3. The multi-level converter of claim 2, wherein when the (M+1) upper transistors are turned on, or when none of the upper transistors are turned on, the balance switch is turned off.

4. The multi-level converter of claim 2, wherein in a steady-state operation, the multi-level converter is configured to control a time period during which n upper transistors are simultaneously turned on and a time period during which (n−1) upper transistors among the (M+1) upper transistors alternately in each operation cycle, wherein n is determined according to a duty cycle of the switch capacitor circuit, M+1≥n≥1, and n is a positive integer.

5. The multi-level converter of claim 2, wherein the balance circuit determines a time period during which the balance capacitor is coupled to at least one of the flying capacitors according to the number of alternately conducting upper transistors among the (M+1) upper transistors.

6. The multi-level converter of claim 2, wherein the balance circuit determines a time period during which the balance capacitor is coupled to at least one of the flying capacitors according to a comparison result between a time period during which n upper transistors are simultaneously turned on and a time period during which the n−1 upper transistors are simultaneously turned on, wherein, M+1≥n>1.

7. The multi-level converter of claim 6, wherein when the time period during which n upper transistors are simultaneously turned on is greater than time period during which the (n−1) upper transistors are simultaneously turned on, after a voltage on the balance capacitor is adjusted to VIN*n/(M+1) or VOUT*n/(M+1), the balance switch is turned on when only n upper transistors are turned on simultaneously, and is turned off during the operation cycle except for a time period that only n upper transistors are turned on simultaneously, wherein VIN and VOUT are respectively the input voltage and output voltage of the multilevel converter.

8. The multi-level converter of claim 6, wherein when the time period during which n upper transistors are simultaneously turned on is less than time period during which the (n−1) upper transistors are simultaneously turned on, after a voltage on the balance capacitor is adjusted to VIN*(n−1)/(M+1) or VOUT*(n−1)/(M+1), the balance switch is turned on when only (n−1) upper transistors are turned on simultaneously, and is turned off during the operation cycle except for a time period that only (n−1) upper transistors are turned on simultaneously, wherein VIN and VOUT are the input voltage and output voltage of the multilevel converter respectively.

9. The multi-level converter of claim 5, wherein when n=1, in one operation cycle, a time period during which one upper transistor is turned on and a time period during which no upper transistor is turned on is alternated, after a voltage on the balance capacitor is adjusted to VIN/(M+1) or VOUT/(M+1), the balance switch is turned on when only one upper transistor is turned on, and is turned off during the operation cycle except for a time period that only one upper transistor is turned on, wherein VIN and VOUT are the input voltage and output voltage of the multilevel converter respectively.

10. The multi-level converter of claim 5, wherein when n=M+1, in one operation cycle, a time period during which (M+1) upper transistors are turned on and a time period during which M upper transistors are turned on is alternated, after a voltage on the balance capacitor is adjusted to VIN*M/(M+1) or VOUT*M/(M+1), the balance switch is turned on when only M upper transistors are turned on, and is turned off during the operation cycle except for a time period that only M upper transistors is turned on, wherein VIN and VOUT are the input voltage and output voltage of the multilevel converter respectively.

11. A multi-level converter comprising: a) a switch capacitor circuit having M flying capacitors and 2*(M+1) transistors, wherein M is a positive integer; b) an inductive element; c) a balance circuit coupled to a common node of the switch capacitor circuit and the inductive element, and comprising a balance switch and a balance capacitor; d) wherein after a voltage of the balance capacitor is adjusted to a preset value, the flying capacitor and the balancing capacitor are coupled to each other in one of series and parallel connections by controlling the balance switch to be selectively turned on and off; and e) wherein the balance switch is configured as a bidirectional current blocking transistor.

12. A multi-level converter comprising: a) a switch capacitor circuit having M flying capacitors and 2*(M+1) transistors, wherein M is a positive integer; b) an inductive element; c) a balance circuit coupled to a common node of the switch capacitor circuit and the inductive element, and comprising a balance switch and a balance capacitor; d) wherein after a voltage of the balance capacitor is adjusted to a preset value, the flying capacitor and the balancing capacitor are coupled to each other in one of series and parallel connections by controlling the balance switch to be selectively turned on and off; and e) wherein the balance circuit comprises a control circuit that is configured to control the balance switch, such that a proportional relation is generated between the voltage on the balance capacitor and the voltage on the flying capacitor, and a proportional relation is generated between the voltage on the balance capacitor, the voltage on the flying capacitor and an input voltage or an output voltage.

13. The multi-level converter of claim 1, wherein the balance circuit comprises a charging and discharging circuit configured to charge and discharge the balance capacitor.

14. The multi-level converter of claim 13, wherein the charging and discharging circuit comprises:

a) a first current source; and b) a second current source coupled in series with the first current source, and coupled in parallel with the balance capacitor.

* * * * *